Sept. 24, 1946.   K. A. SMITH   2,408,346
PISTON
Filed Oct. 7, 1944

Kave A. Smith,
Inventor.
Haynes and Koenig
Attorneys.

Patented Sept. 24, 1946

2,408,346

UNITED STATES PATENT OFFICE 2,408,346

PISTON

Kave A. Smith, Overland, Mo., assignor to Lincoln Engineering Company, St. Louis, Mo., a corporation of Missouri Application October 7, 1944, Serial No. 557,587

5 Claims. (Cl. 309—4)

1

This invention relates to pistons, and with regard to certain more specific features, to follower pistons for lubricant containers and the like, being an improvement over the piston shown in the copending U. S. patent application of Lutwin C. Rotter and Victor G. Klein, Serial No. 485,966, now Patent Number 2,394,488, filed May 7, 1943, for Lubricating apparatus.

Among the several objects of the invention may be noted the provision of a piston which greatly simplifies assembling procedure and reduces the cost of manufacture; and the provision of a piston of the class described which eliminates several unhandy fasteners, whereby replacement in the field of its packing member may readily be accomplished entirely without tools. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a plan view of one side of my new piston;

Similar reference characters indicate corresponding parts throughout the several views of the drawing.

Figure 1:
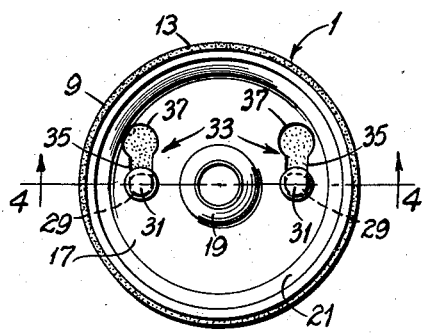
Figure 2:
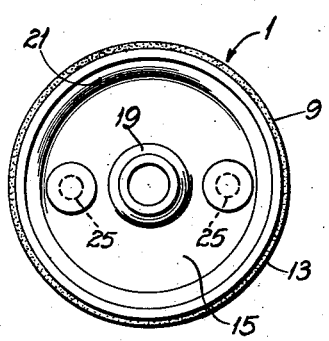
Fig. 2 is a plan view of the opposite side of the piston.
Figure 4:
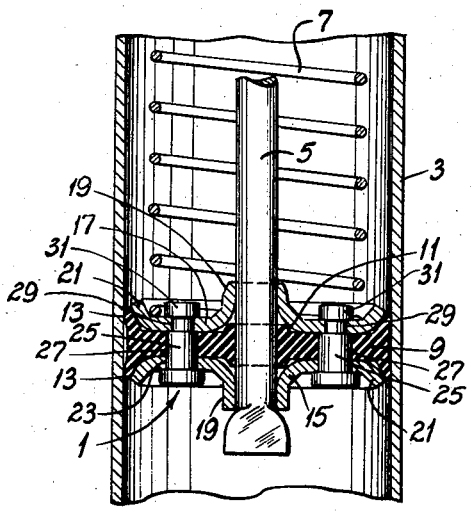
Fig. 4 is a vertical section taken on line 4—4 of Fig. 1 but showing also the cylindric lubricant compartment of a lubricant pump, for which the piston is adapted.

Referring now more particularly to Figs. 1, 2 and 4, numeral 1 indicates my new piston assembled for insertion into a cylinder, the latter being shown at numeral 3 in Fig. 4. This piston is intended to act as a lubricant follower on lubricant carried beneath and in the cylinder 3. To this end it slides upon a retractor rod 5 and is biased by means of a spring 7. Sometimes followers of this type are used in cylinders without rods such as 5.

The invention has to do with the piston per se. This consists of an intermediate resilient packing diaphragm 9, consisting preferably of synthetic rubber or the like which is chemically resistant to attack by lubricants, such as for example, "neoprene." This packing has an elongate hub part 11 which hugs the retractor rod 5. On its periphery are opposite edgewise lips

2

13 which hug the inside of the cylinder 3. One metal head of the piston is shown at 15 and another at 17. Each head 15 and 17 carries a sliding hub 19. The hubs are oppositely directed to accommodate the resilient hub 11 of the packing. Each head 15 and 17 is also provided with an edgewise beveled portion 21 for accommodating the lips 13, these beveled portions being also oppositely directed.

The head 15 is provided with preferably diametrically opposite holes 23 for accommodating the straight shanks 25 of a pair of holding studs. The shanks pass through said openings 23 and also through aligned openings 27 in the packing 9. The openings 27 are of a size adapted to grip and seal around the shanks 25.

Each shank, beyond the diaphragm 9, is grooved, as shown at 29. What may be called a head portion 31 is preferably of the same diameter as shank 27. The grooves 29 are arranged in a plane next to one face of the packing 9, said plane being the one which the head 17 is to assume.

Figure 3:
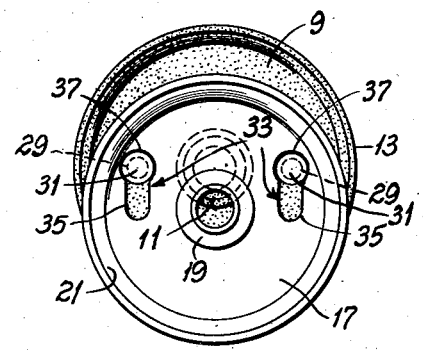
Fig. 3 is a view similar to Fig. 1 showing a preliminary assembly or disassembly operation.

As indicated in Figs. 1 and 3, the head 17 is provided with keyhole openings 33. The small ends or notches 35 of these openings are preferably opposite and must be centered with the openings 23 in the opposite head 15. The enlarged portions 37 of the openings 33 are opposite but not diametrically opposite. Thus the directions of the keyholes are opposite since the left-hand keyhole in Fig. 3 points counterclockwise and the right-hand hole 33 points clockwise. Each enlarged end 37 of each hole 33 freely accommodates a head 31; whereas the small notched part 35 accommodates only the grooved portion 29.

Figure 5:
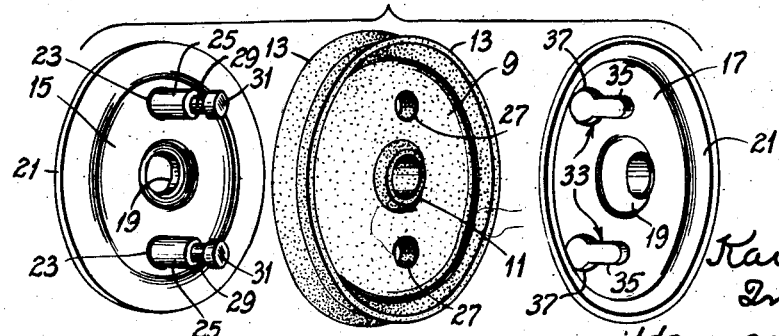
Fig. 5 is an exploded view of the piston parts shown partially disassembled.

Assembly or disassembly is quite easily carried out as is affirmed by comparing Fig. 3 and Fig. 1. In Fig. 3 the studs 25 have been inserted through the openings in the head 15 (see also the left-hand part of Fig. 5). Next, the packing is assembled by inserting the studs 25 through the openings 27 in the packing. Then as shown in Fig. 3, the large portions 37 of the keyhole openings 33 are applied axially over the heads 31. Then the head 17 is slipped laterally into the position shown in Fig. 1, wherein the small ends 35 of the notches 33 are keyed into the recesses 29.

The piston thus assembled may be applied to rod 5 and inserted into the cylinder 3 and thereafter the head 17 cannot slip back into the Fig. 3 position because the rod 5 prevents any substantial misalignment between the head 17 and the packing 9 to the extent that would be required for disassembly. It will be noted that one reason for this fact is that the keyhole openings 33 are not pointed in the same direction around the clock. If they were, the head 17 could, even in the cylinder 3, twist around to a disassembling position.

It will be noted that for disassembly purposes the lengths of the small portions 35 of the keyhole slots 33 are enough to require a degree of misalignment between the head 17 and the packing 9 which is greater than the misalignment which will be permitted by the rod 5 or the cylinder 3 in which the piston 1 operates.

To disassemble the piston is quite easy for all that needs to be done is to remove it from cylinder 3 and rod 5 and then move the head 17 from the position shown in Fig. 1 to that shown in Fig. 3. After this it may be removed axially as suggested in Fig. 5. Removal of the packing diaphragm from the unthreaded studs 25 is then quite easy and may be accomplished without damage.

From the above it will be seen that the invention avoids all threaded studs, nuts, washers and the like, and that assembly and disassembly may readily be accomplished entirely by hand, without tools. It also simplifies assembly and disassembly and reduces the cost of manufacture. It will be noted that a part of the reason for the simplification accomplished is the use of the rod 5 (on which the piston operates) for preventing working loose of the head 17. In other words, the head 17 needs to pass through a sequence of positions for disassembly which the rod 5 will not permit when the piston is thereon. It will be understood that in cases where the follower is used in a cylinder without a rod such as 5, the heads 15 and 17 are made without central openings and that in such cases it is the cylinder such as 3 which prevents the head 17 from passing through a sequence of positions which would cause its disassembly in the cylinder. Broadly considered, either cylinder 3 and/or rod 5 may be considered to be a cooperating cylindric member in connection with which the piston operates, whereby is prevented disassembly under working conditions.

While a single keyhole slot and one stud could be used, two or more with a symmetrical relationship between the stud positions is preferable for a balanced holding action by the studs.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A piston comprising an intermediate packing member, a head on one side of said member having openings, said packing having openings aligned therewith, studs passing through said openings, a second head on the opposite side of said packing member, said studs having recesses in the plane of said second head and adjacent to the packing, and keyhole openings in the second head having notched portions cooperating only with said recesses respectively and being oppositely directed with respect to the clock, said keyhole openings having enlarged portions accommodating the non-grooved portions of said studs beyond the grooves, said heads and packing being adapted to be maintained in alignment by the interior wall of the cylinder in which said piston is used.

2. A piston comprising an intermediate packing member, a head on one side of said member having diametrically opposite openings, said packing having openings aligned therewith, studs passing through said openings, a second head on the opposite side of said packing member, said studs having grooves in the plane of said second head and adjacent to the packing, and keyhole openings in the second head having notched portions cooperating only with said grooves and oppositely directed with respect to the clock, said notched portions being diametrically opposite one another, said keyhole openings having enlarged portions accommodating the non-grooved portions of said studs beyond the grooves, said heads and packing being adapted to be maintained in alignment by the interior wall of the cylinder in which said piston is used.

3. A piston comprising an intermediate packing member, a head on one side of said member having diametrically opposite openings, said packing having openings aligned therewith, studs passing through said openings, a second head on the opposite side of said packing member, said studs having grooves in the plane of said second head adjacent to the packing, and keyhole openings in the second head having notched portions cooperating with said grooves and oppositely directed with respect to a radius of the piston, said keyhole openings having enlarged portions accommodating the non-grooved portions of said studs beyond the grooves, the length of said notched portions of the keyhole openings being such as to require for disassembly a misalignment between the head in which they are located and the packing member which is greater than that which is permitted by the cylindric member in connection with which the piston cooperates.

4. A piston comprising an intermediate packing member, a head on one side of said member having an opening, said packing having an opening aligned therewith, a stud passing through said opening, a second head on the opposite side of said packing member, said stud having a groove in the plane of said second head adjacent to the packing, and a keyhole opening in the second head having a notched portion cooperating only with said groove, said keyhole opening having an enlarged portion accommodating the groove of said stud, the length of said notched portion of the keyhole opening being such as to require for disassembly a misalignment between the head in which it is located and the packing member which is greater than that which is permitted by the cylindric member in connection with which the piston cooperates.

5. A piston comprising an intermediate packing member and a pair of heads between which the packing member is disposed, a post projecting from one head through an opening in said packing member, and through a keyhole opening in the other head, said keyhole opening being formed to provide an aperture larger than said post and a smaller notched portion extending therefrom, said post having a groove in the plane of said other head adjacent the packing member, said notched portion cooperating with said groove to prevent axial separation of the heads and packing member and being of such length and extending from said aperture in such direction as to prevent both relative rotation and separation of said other head when the heads and packing member are maintained in alignment by the cylindric member in connection with which the piston is used.

KAVE A. SMITH.